United States Patent
Wang

(10) Patent No.: US 9,315,641 B2
(45) Date of Patent: Apr. 19, 2016

(54) PRODUCT COMPRISING ULTRAFINE NATURAL GLASS

(75) Inventor: Bo Wang, Lompoc, CA (US)

(73) Assignee: IMERYS FILTRATION MINERALS, INC., San Jose, CA (US)

( * ) Notice: Subject to any disclaimer, the term of this patent is extended or adjusted under 35 U.S.C. 154(b) by 726 days.

(21) Appl. No.: 13/496,665

(22) PCT Filed: Sep. 15, 2010

(86) PCT No.: PCT/US2010/048941
§ 371 (c)(1),
(2), (4) Date: Mar. 16, 2012

(87) PCT Pub. No.: WO2011/034926
PCT Pub. Date: Mar. 24, 2011

(65) Prior Publication Data
US 2012/0178875 A1    Jul. 12, 2012

Related U.S. Application Data

(60) Provisional application No. 61/243,590, filed on Sep. 18, 2009.

(51) Int. Cl.
| | |
|---|---|
| C08K 3/40 | (2006.01) |
| C08L 67/00 | (2006.01) |
| C08L 77/00 | (2006.01) |
| C08L 83/04 | (2006.01) |
| C08L 71/00 | (2006.01) |
| C08L 81/04 | (2006.01) |
| C08L 81/06 | (2006.01) |
| C08L 75/04 | (2006.01) |
| B32B 5/16 | (2006.01) |
| C08K 3/00 | (2006.01) |
| C03C 12/00 | (2006.01) |
| C08K 7/20 | (2006.01) |
| C08L 23/06 | (2006.01) |

(52) U.S. Cl.
CPC . *C08K 3/00* (2013.01); *C03C 12/00* (2013.01); *C08K 7/20* (2013.01); *C08L 23/06* (2013.01); *C08L 2205/18* (2013.01); *C08L 2207/066* (2013.01); *Y10T 428/2982* (2015.01)

(58) Field of Classification Search
CPC ...... C08K 7/20; C08K 3/00; C08L 2207/066; C08L 2205/18; C08L 23/06; C03C 12/00
USPC ............ 524/586, 599, 606, 543, 1, 590, 612, 524/609, 588; 428/402; 106/489
See application file for complete search history.

(56) References Cited

U.S. PATENT DOCUMENTS

| | | | |
|---|---|---|---|
| 5,908,890 A | 6/1999 | Cornett | |
| 6,254,981 B1 | 7/2001 | Castle | |
| 6,464,770 B1 | 10/2002 | Palm et al. | |
| 6,531,222 B1 * | 3/2003 | Tanaka et al. | 428/402 |
| 6,712,898 B2 | 3/2004 | Palm et al. | |
| 2003/0073778 A1 * | 4/2003 | Zhang et al. | 524/555 |
| 2003/0224702 A1 | 12/2003 | Roulston et al. | |
| 2005/0032965 A1 | 2/2005 | Valero | |
| 2006/0075930 A1 | 4/2006 | Wang et al. | |
| 2008/0115937 A1 | 5/2008 | Reddy | |
| 2009/0013905 A1 | 1/2009 | VanRemortel et al. | |

FOREIGN PATENT DOCUMENTS

| | | |
|---|---|---|
| JP | 2003-253141 | 10/2003 |
| WO | WO 2007/010276 A1 | 1/2007 |
| WO | WO 2008/081173 A1 | 7/2008 |
| WO | WO 2010/104831 A1 | 9/2010 |
| WO | WO 2011/034926 A1 | 3/2011 |

OTHER PUBLICATIONS

International Search Report and Written Opinion issued Nov. 18, 2010 in International Application No. PCT/US2010/048941, filed Sep. 15, 2010.
Barker, James M.; Santini, Ken, "Perlite", Industrial Minerals & Rocks (2006) pp. 685-702.
Extended European Search Report issued Feb. 17, 2015, in corresponding European Patent Application No. 10817763.5.

* cited by examiner

*Primary Examiner* — Bijan Ahvazi
*Assistant Examiner* — Catherine S Branch
(74) *Attorney, Agent, or Firm* — Finnegan, Henderson, Farabow, Garrett & Dunner LLP

(57) ABSTRACT

A product including ultrafine natural glass, methods of producing the ultrafine natural glass, and methods of use thereof are provided. The product may have, for example, a small top cut ($d_{99}$) particle size of, for example, less than 12 microns. The product may also have high blue light brightness higher than, for example, 69, and/or low oil absorption, for example, less than 100 percent in volume. The product may be used in a variety of applications, such as, for example, anti-block filler in plastic films and/or reinforcement filler in polymers.

11 Claims, No Drawings

PRODUCT COMPRISING ULTRAFINE NATURAL GLASS

CLAIM OF PRIORITY AND INCORPORATION BY REFERENCE

This application is a U.S. National stage entry under 35 U.S.C. §371 from PCT International Application No. PCT/US2010/048941, filed Sep. 15, 2010, and claims priority to and the benefit of U.S. Provisional Application No. 61/243,590, filed Sep. 18, 2009, the subject matter of both of which is incorporated herein by reference.

FIELD OF THE DISCLOSURE

This disclosure relates to a product comprising an ultrafine natural glass, such as for example ultrafine unexpanded perlite, which may be used, for example, as a filler product in various filler applications.

BACKGROUND OF THE DISCLOSURE

Fillers are added to plastics for enhancement of various structural, processing, and application properties. Anti-block products are commonly used in plastic films to lessen the adhesion or blocking of the plastic film surface. This can be achieved by slightly roughening the film surface through surface treatment with wax/polymers or by adding anti-block filler products into the plastic films. Commercial anti-block filler products include synthetic silica, natural silica (such as diatomaceous earth), and other mineral products such as talc, calcium carbonate, and nepheline syenite. These additives are intended to produce microscopic roughness on the surface of the film to minimize the flat contact between adjacent layers, in particular, to prevent individual layers from sticking to one another or "blocking."

Although synthetic silica has good anti-block performance and optical properties, its high cost can limit its applications in plastic films. Diatomaceous earth is an effective anti-block agent with a more moderate cost. The anti-block performance of other mineral products such as talc, calcium carbonate, and nepheline syenite are typically not as effective compared to diatomaceous earth.

Mineral fillers have been added to thermoplastic and thermoset materials to improve their properties, including tensile strength, heat distortion temperature, and modulus. Besides providing improved properties, fillers also reduce costs since the filled thermoplastics are sold in even larger volumes than neat thermoplastics.

Thermoplastic materials are those which typically soften under the action of heat and harden again to their original characteristics on cooling. By conventional definition, thermoplastics are typically straight and branched linear chain organic polymers with a molecular bond. Examples of well-known thermoplastics include products of acrylonitrile butadiene styrene (ABS), styrene acrylonitrile (SAN), acrylate styrene acrylonitrile (ASA), and methacrylate butadiene styrene (MBS). Also included are polymers of formaldehyde, known as "acetals"; polymers of methyl methacrylate, known as "acrylic plastics"; polymers of monomeric styrene, known as "polystyrenes"; polymers of fluorinated monomers, known as "fluorocarbons"; polymers of amide chains, known as "nylons"; polymers of paraffins and olefins, known as "polyethylenes," "polypropylenes," and "polyolefins"; polymers composed of repeating bisphenol and carbonate groups, known as "polycarbonates"; polymers of terephthalates, known as "polyesters"; polymers of bisphenol and dicarboxylic acids, known as "polyarylates"; and polymers of vinyl chlorides, known as "polyvinyl chlorides" (PVC).

High performance thermoplastics may exhibit extraordinary properties. For example, polyphenylene sulfide (PPS), has exceptionally high strength and rigidity, polyether ketone (PEK), polyether ether ketone (PEEK), and polyamide imide (PAI) have very high strength and rigidity, as well as exceptional heat resistance, and polyetherimide (PEI) has inherent flame resistance. Unusual thermoplastics include ionomers, in particular, copolymers of ethylene and methacrylic acid that have ionic rather than covalent crosslinking, which results in behavior resembling that of thermoset plastics in their operating range; polyvinylcarbazole, which has unique electrical properties; and polymers of isobutylene, known as "polyisobutylenes," which are viscous at room temperature.

Thermoset plastics are synthetic resins that are typically permanently changed upon thermal curing, that is, they solidify into an infusible state so that they do not soften and become plastic again upon subsequent heating. However, certain thermoset plastics may exhibit thermoplastic behavior over a limited portion of their useful application ranges, and are similarly useful as matrix components in applications employing exemplary embodiments of the products disclosed herein. Some types of thermoset plastics, especially certain polyesters and epoxides, are capable of cold curing at room temperature. Thermoset plastics include alkyds, phenolics, epoxides, aminos (including urea-formaldehyde and melamine-formaldehyde), polyimides, and some silicon plastics.

The adhesion of the polymer matrix onto filler particles can impact the reinforcement provided by the filler. The mechanical properties can be further enhanced if the polymer matrix adheres to the filler particle surface through chemical coupling agents such as silanes.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to an ultrafine natural glass product having a top cut ($d_{99}$) particle size of less than 12 microns, such as, for example, a top cut ($d_{99}$) particle size of less than 10 microns, or a top cut ($d_{99}$) particle size of less than 8 microns. In another aspect, the unexpanded perlite has a top cut ($d_{99}$) particle size ranging from 7 microns to 12 microns.

In another aspect, the ultrafine natural glass product has a ($d_{100}$) particle size of less than 20 microns, such as, for example, a ($d_{100}$) particle size of less than 15 microns, or a ($d_{100}$) particle size of less than 11 microns.

In yet another aspect, the ultrafine natural glass product has a median ($d_{50}$) particle size of less than 5 microns, such as, for example, less than 3 microns.

In another embodiment, the ultrafine natural glass product is an unexpanded perlite. In another embodiment, the ultrafine natural glass product is selected from pumice, obsidian, volcanic ash or shirasu.

In another aspect, the ultrafine natural glass product has an oil absorption of less than about 100, such as, for example, an oil absorption of less than about 80 percent by weight, less than 75 percent by weight, or less than 70% by weight.

In another aspect, the ultrafine natural glass product has a blue light brightness of greater than 69. In another aspect, the unexpanded perlite has a whiteness (L-value) of greater than 80, such as, for example, greater than 85. In yet another aspect, the ultrafine natural glass product has a yellowness (b-value) of less than 5. In yet another aspect, the ultrafine natural glass product has a redness (a-value) of less than 1.5.

In another aspect, the surface of the ultrafine natural glass product can be modified by silanization.

In yet another aspect, a polymer product may comprise a product comprising an embodiment of the ultrafine natural glass product disclosed herein. In one aspect, the polymer may be a polyolefin. In another aspect, the polymer can be selected from the group consisting of aliphatic and aromatic polyesters; polyester block copolymers; aliphatic and aromatic polyamides; vinyl polymers; fluorocarbon polymers; polyurethanes; polyethers; polyether and polyester block polymers; polysulfides; polysulfones; polysiloxanes; polycarbonates; and copolymers, terpolymers, and blends thereof. In yet another aspect, a polymer film may comprise a product comprising an embodiment of the ultrafine natural glass product disclosed herein.

Additional objects and advantages of the disclosed embodiments will be set forth in part in the description which follows, and in part will be obvious from the description, or may be learned by practice of those embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EXEMPLARY EMBODIMENTS

Reference will now be made in detail to exemplary embodiments of the invention.

According to some exemplary embodiments, a product may include an ultrafine natural glass product having an top-cut controlled particle size. One embodiment provides an ultrafine natural glass product having a top cut ($d_{99}$) particle size of less than 12 microns.

In a further embodiment, the ultrafine natural glass product is characterized by high blue light brightness, for example, greater than 69, and/or low oil absorption, for example, less than 100 percent by weight. Some exemplary embodiments of the ultrafine natural glass product can advantageously have very fine particle size, low oil absorption, and/or high blue light brightness, thereby making them especially suitable for use in, for example, anti-block filler applications.

Natural Glass

The term "natural glass" is used herein the conventional sense and refers to natural glasses, commonly referred to as "volcanic glasses," which may be formed by the rapid cooling of siliceous magma or lava. Most natural glasses are chemically equivalent to rhyolite. Natural glasses which are chemically equivalent to trachyte, dacite, andesite, latite, shirasu, and basalt are known but are less common. The term "obsidian" is generally applied to dark, most often black, massive natural glasses that are rich in silica (i.e., $SiO_2$). Obsidian glasses may be classified into subcategories according to their silica content, with rhyolitic obsidians (containing typically about 73% $SiO_2$ by weight) as the most common. Perlite is another common natural glass.

Embodiments of the ultrafine natural glass product may be derived from perlite ore, such as for example unexpanded perlite ore. Perlite ore is a hydrated natural glass containing typically about 72-75% $SiO_2$, 12-14% $Al_2O_3$, 0.5-2% $Fe_2O_3$, 3-5% $Na_2O$, 4-5% $K_2O$, 0.4-1.5% CaO (by weight), and small concentrations of other metallic elements. Perlite ore is distinguished from other natural glasses by a higher content (e.g., 2-10% by weight) of chemically-bonded water, the presence of a vitreous, pearly luster, and characteristic concentric or arcuate onion skin-like (i.e., "perlitic") fractures.

A. Exemplary Methods for Preparing Examples of Ultrafine Natural Glass Products

As described above, embodiments of the ultrafine natural glass products may have a defined particle size and other unique physical properties. The ultrafine natural glass products can be prepared by several methods.

In one embodiment, a top size-controlled ultrafine natural glass product may be produced by classifying a natural glass feed material on commercially available air classifiers. For example, pilot scale classifiers such as Alpine™ 200 ATP or Micron Separator MS-1H classifiers (both from Hosokawa Micron Powder Systems, Summit, N.J.) may be used for the classification of perlite ore feed material. These classifiers mainly consist of a horizontally or vertically mounted high speed classifying wheels and a classifying air outlet. The classifying air injected into the machine base flows inwards through the classifying wheel and discharges the fine material, whereas the coarse particles rejected by the classifying wheel leave the classifier through the coarse material outlet.

Parameters such as classifier wheel speed and air flow pressure may be optimized to achieve desired products. Examples of typical parameters for the 200 ATP classifier include: classifier wheel speed ranging from 3000 to 5000 rpm and total air flow pressure ranging from 400 to 500 SCFM. Examples of typical parameters for the Micron Separator MS-1H classifier include: classifier wheel speed at 5000 rpm and total air flow pressure ranging from 400 to 500 SCFM.

Other possible methods of preparing examples of the ultrafine natural glass products may include milling of natural glass in conjunction with classification. Examples of mills include a ball mill, a stirred media mill, a jet mill, and a fixed gap mill, such as a roller mill. Wet classification techniques can also be used, such as, for example, sedimentation, which separates suspended solid particles from a liquid by gravity settling, and hydrocycloning, which uses centrifugal action to classify particles in a liquid media.

The ultrafine natural glass products may be further modified in alternative embodiments to enhance its performance in specific applications. For example, its surfaces may be treated with wax or other materials to improve its physical properties.

In some embodiments, the ultrafine natural glass products can be modified by silanization to render the surfaces either more hydrophobic or hydrophilic using the methods appropriate for silicate minerals. For example, the ultrafine natural glass product can be placed in a plastic vessel, and a small quantity of dimethyldichlorosilane (i.e., $SiCl_2(CH_3)_2$) or hexadimethylsilazane (i.e., $(CH_3)_3Si—NH—Si(CH_3)_3$) is added to the vessel. Reaction is allowed to take place at the surface in the vapor phase, for example, over a 24 hour period, resulting in more hydrophobic products. Such products have applications in compositions used in chromatography, for example, and also when used in conjunction with other hydrophobic materials for improved mechanical performance, for example, in applications involving hydrocarbons and oils, and also to provide reinforcement in plastics and other polymers.

Similarly, the ultrafine natural glass product can be reacted to obtain other embodiments, for example, by suspending it in a solution containing 10% (w/v) aminopropyltriethoxysilane (i.e., $C_9H_{23}NO_3Si$) in water, refluxing at 70° C. for 3 hours, filtering the mixture, and drying the remaining solids to obtain more hydrophilic products. Such products may have applications in compositions used in chromatography, for example, especially when used in conjunction with aqueous systems for improved mechanical performance, and to permit further derivatization of the product, having converted terminal hydroxyl (i.e., —OH) functional groups at the surface of the ultrafine unexpanded perlite to aminopropyl groups (i.e., —$(CH_2)_3NH_2$). The hydrophilic (e.g., silanized) modified, ultrafine natural glass product can be further reacted to bind an organic compound, for example, a protein; the ultrafine unexpanded perlite product thereby serving as a support for the immobilization of the organic compound. So modified, the product has utility in applications such as, for example, affinity chromatography and biochemical purification.

Surfaces of the ultrafine natural glass product may be treated with acids or complexing agents to reduce the concentration of soluble substances. Such methods include, but are not limited to, leaching at ambient or elevated temperatures in the presence of such substances as sulfuric acid (i.e., $H_2SO_4$), hydrochloric acid (i.e., HCl), nitric acid (i.e., $HNO_3$), phosphoric acid (i.e., $H_3PO_4$), acetic acid (i.e., $CH_3COOH$), citric acid (i.e., $C_6H_3O_7.H_2O$), or ethylenedinitrilotetraacetic acid (i.e., "EDTA").

Surfaces of the ultrafine natural glass products may also be etched with etchants appropriate for glasses, including, but not limited to, hydrofluoric acid (i.e., HF), ammonium bifluoride (i.e., $NH_4F.HF$), or sodium hydroxide (i.e., NaOH). Surface etching may enhance subsequent treatment processes; for example, etching may increase the number of terminal hydroxyl groups, which in turn may subsequently react with various silanes.

B. Methods for Characterizing Examples of Ultrafine Natural Glass Products

1. Particle Size Distribution

The particle size distribution of samples may be determined in accordance with, for example, the phenomenon of scattered light from a laser beam projected through a stream of particles. The amount and direction of light scattered by the particles is measured by an optical detector array and then analyzed by a microcomputer, which calculates the size distribution of the particles in the sample stream. Data reported may be collected in one exemplary embodiment on a Leeds and Northrup Microtrac X100 laser particle size analyzer (Leeds and Northrup, North Wales, Pa.). This instrument can determine particle size distribution over a particle size range from 0.12 to 704 microns. Median particle size ($d_{50}$) is defined as that size for which 50 percent of the volume that is smaller than the indicated size. Top cut particle size ($d_{99}$) or ($d_{100}$) is defined as that size for which 99 or 100 percent of the volume that is smaller than the indicated size.

In one embodiment, the ultrafine natural glass product has a top cut ($d_{99}$) particle size of less than 12 microns. In another embodiment the ultrafine natural glass product has a top cut ($d_{99}$) of less than 10 microns. In yet another embodiment, the ultrafine natural glass product has a top cut ($d_{99}$) of less than 8 microns. In another embodiment, the ultrafine natural glass product has a top cut ($d_{99}$) ranging from 7 microns to 12 microns.

In one embodiment, the ultrafine natural glass product has a ($d_{100}$) particle size of less than 20 microns. In another embodiment, the ultrafine natural glass product has a ($d_{100}$) particle size of less than 15 microns. In yet another embodiment, the ultrafine natural glass product has a ($d_{100}$) particle size of less than 11 microns.

In one embodiment, the ultrafine natural glass product has a median particle size ($d_{50}$) less than 5 microns. In another embodiment, the median particle size is less than 3 microns, for example, a median particle size ranging from 2 to 3 microns.

2. Color

Color may be measured by any appropriate measurement technique known to the skilled artisan or hereafter discovered. The color of the unexpanded perlite product may be determined using Hunter scale "L," "a," and/or "b" color data collected on a Spectro/plus Spectrophotometer (Color and Appearance Technology, Inc., Princeton, N.J.). The L-value indicates the level of light or dark, the a-value indicates the level of redness or greenness, and the b-value indicates the level of yellowness or blueness. Blue light brightness can be calculated from the L-, a-, and b-value data. A krypton-filled incandescent lamp may be used as the light source. The instrument may be calibrated according to the manufacturer's instructions using a highly polished black glass standard and a factory-calibrated white opal glass standard. For example, a plastic plate having a depression machined therein is filled with sample, which is then compressed with a smooth-faced plate using a circular pressing motion. The smooth-faced plate is carefully removed to insure an even, unmarred surface. The sample is then placed under the instrument's sample aperture for the measurements.

In one embodiment, the ultrafine natural glass product can have a blue light brightness greater than 69, such as, for example, a blue light brightness greater than 70. In another embodiment, the ultrafine natural glass product has a whiteness (L-value) of greater than 80, such as, for example, greater than 85. In another embodiment, the ultrafine natural glass product has a yellowness (b-value) of less than 5. In yet another embodiment, the unexpanded perlite product has an a-value of less than 1.5.

3. Oil Absorption

The oil absorption capacity of the samples according to exemplary embodiments is determined on a weight basis. For example, 5 or 10 grams of the sample is placed in a 300 ml ceramic casserole. Linseed oil from a 50 ml glass burette is then added to the sample at the rate of 1 drop per second. During addition of oil, the mixture is stirred using a spatula, so that each drop of oil falls on a dry position of the sample. As absorption of oil progresses, the lumps of paste form larger lumps and the oil addition rate should be decreased at this point. The absorption reaches its end point when the entire dry sample is wet and picked up. The volume of the oil used is then recorded and the oil absorption in weight percentage can thus be calculated:

$$\text{Oil absorption (in weight percentage)} = (\text{volume of oil used (ml)} \times \text{specific gravity of oil})/(\text{weight of sample (g)}) \times 100$$

Some embodiments of the ultrafine natural glass product preferably have an oil absorption less than 100 percent by weight (usually in the range of from 65 to 80 percent by weight), such as, for example, an oil absorption less than 80 percent by weight, an oil absorption of less than 75 percent by weight, or even an oil absorption of less than 70 percent by weight. Compared with the oil absorption of conventional expanded perlite products, which are typically greater than 180 percent by weight, exemplary embodiments of the ultrafine unexpanded perlite product disclosed herein may have a significantly lower oil absorption.

4. Anti-Block Performance Tests in Low Density Polyethylene (LDPE) Films

"Anti-block performance" refers to the ability to reduce adhesion or blocking of the plastic film surface. Anti-block performance may be measured by manufacturing a polyethylene film containing 2000 ppm of an unexpanded perlite filler product and measuring the anti-block performance of the film. The films are extruded into nominal 1.25 mm films, based on Equistar low density polyethylene (LDPE) 345-013 resin. 750 ppm of Chemtura Kemamide® E Ultra Powder erucamide slip agent is added to each sample. Extrusion of the films is performed with a ¾ inch single screw extruder, equipped with a 2.5 inch blown film die. After conditioning the films for 24 hours at 30° C. and 50% relative humidity, the film samples are cut, destaticized, and prepared for induced blocking and optical tests based on ASTM D 3354 and ASTM D 1003, respectively. Anti-block performance may be evaluated by measuring the induced blocking properties, such as the force needed to separate two films stuck together. Anti-block performance may also be evaluated by measuring the haze of the film.

Some embodiments of the ultrafine natural glass product can exhibit a blocking force of less than 35 grams at a concentration of ultrafine natural glass of 2000 parts per million, when measured in accordance with ASTM D 3354. In other embodiments, the ultrafine natural glass product can exhibit a haze of 7% or less at a concentration of ultrafine natural glass of 2000 parts per million, when measured in accordance with ASTM D 1003.

C. Exemplary Methods of Using Exemplary Ultrafine Natural Glass Products

The various embodiments of ultrafine natural glass defined herein may be used in a manner analogous to currently available anti-block filler products in plastic film applications.

Certain applications may gain additional benefit from using ultrafine natural glass product that has been modified or derivatized, for example, by leaching with acid or complexing agents, by etching, by silanization, or by coupling organic molecules to a silanized functionality.

Exemplary embodiments of the ultrafine natural glass product disclosed herein may be used as a functional filler and, more particularly, as an anti-block filler or a reinforcing filler. Functional fillers are typically added, that is, "compounded," to other substances to make a material mixture that may commonly be referred to as "filled." The means of compounding usually allows one or more specific functional properties to be imparted to the filled material. These functional properties are often physical in nature, and may involve various mechanical or optical effects. Occasionally, chemical functionality is imparted, and this may also alter electrical properties. Exemplary embodiments of the ultrafine natural glass product may be effective when compounded in filled materials, so as to impart the functionality of the improved perlite product to the filled material.

One common exemplary method of adding ultrafine natural glass product to prepare a filled material may be to blend it into a mixture at a concentration needed to impart the desired level of a property. For example, to reinforce nylon, ultrafine natural glass product may be added to a controlled-temperature twin-screw extruder to which unfilled nylon is being fed and made molten. Embodiments of the ultrafine natural glass product may be fed into the extruder through a hopper and may be uniformly blended into the nylon. The mixture emerges from the extruder and is cooled. Then, for example, the mixture can be further compression molded or injection molded into useful shapes, and the molded pieces of filled nylon may be suitably reinforced compared with the unfilled nylon.

Examples of other filler applications include use of the ultrafine natural glass product distribution as a flatting agent or as an aid to improve scrubbability in paints and coatings; as an anti-block agent in polymers, such as polyethylene or polypropylene film; as a functional filler in paper, including as a drainage aid and in stickies pacification in paper manufacture; as a reinforcing agent in plastics, including nylon, polypropylene, phenolics and brake pad manufacture; and as a filler for adhesive, sealant, and joint compounds. The ultrafine natural glass product may be also used in flame-resistant polymer applications.

Exemplary embodiments of the ultrafine natural glass product can also be useful in abrasive, polishing, buffing, or cleansing formulations, where it may impart an abrasive property. Further, exemplary embodiments of the ultrafine natural glass product may be useful in ceramics and ceramic mixtures, including tile, asphalt, concrete, mortar, plaster, stucco, grout, and aggregate. Exemplary embodiments of the ultrafine natural glass product may be applied to architectural products, including, for example, roofing shingles or sheets, architectural siding, flooring, or acoustical tile with similar efficacy.

The aforementioned exemplary applications describe the utility of exemplary embodiments of the ultrafine unexpanded perlite product disclosed herein, but many other applications may be envisioned for the ultrafine unexpanded perlite product.

EXAMPLES

Examples of the ultrafine natural glass product and exemplary methods for their preparation are described in the following examples, which are offered by way of illustration and not by way of limitation.

Particle size data were collected on a Leeds and Northrup Microtrac X100 laser particle size analyzer (Leeds and Northrup, North Wales, Pa.).

Examples 1 to 7 were prepared using a pilot scale Micron Separator MS-1H classifiers (Hosokawa Micron Powder Systems, Summit, N.J.). A commercially available unexpanded perlite product, Harborlite® MB, was used as the feed material. This feed material had a particle size distribution (PSD) from 1 μm ($d_{10}$) to 16 μm ($d_{99}$). Parameters such as classifier rotor speed and air flow pressure were optimized as shown in Table 1 to achieve desired products.

TABLE 1

| Example | Rotor Speed (rpm) | Feed rate (lb/hr) | Primary Air (CFM) | Secondary Air (CFM) | Yield (%) |
| --- | --- | --- | --- | --- | --- |
| Example 1 | 5000 | 79 | 300 | 200 | 92 |
| Example 2 | 5000 | 96 | 300 | 100 | 72 |
| Example 3 | 5000 | 99 | 300 | 200 | 90 |
| Example 4 | 5000 | 85 | 300 | 100 | 90 |
| Example 5 | 5000 | 198 | 300 | 100 | 52 |
| Example 6 | 5000 | 191 | 400 | 100 | 76 |
| Example 7 | 5000 | 180 | 400 | 100 | 79 |

Examples 8 to 15 were prepared using a pilot scale Alpine™ 200 ATP (Hosokawa Micron Powder Systems, Summit, N.J.). A commercially available unexpanded perlite product, Harborlite® MB, was used as the feed material. This feed material had a particle size distribution (PSD) from 1 μm ($d_{10}$) to 16 μm ($d_{99}$). Parameters such as classifier rotor speed and air flow pressure were optimized as shown in Table 2 to achieve desired products.

TABLE 2

| Example | Rotor Speed (rpm) | Feed rate (lb/hr) | Primary Air (CFM) | Secondary Air (CFM) | Yield (%) |
|---|---|---|---|---|---|
| Example 8 | 3380 | 123 | 400 | 100 | 76 |
| Example 9 | 4800 | 131 | 400 | 100 | 68 |
| Example 10 | 4800 | 136 | 400 | 100 | 63 |
| Example 11 | 4800 | 255 | 300 | 100 | 58 |
| Example 12 | 4800 | 248 | 200 | 200 | 59 |
| Example 13 | 4800 | 283 | 200 | 200 | 50 |
| Example 14 | 4800 | 283 | 200 | 200 | 50 |
| Example 15 | 6000 | 245 | 200 | 200 | 51 |

The particle size distribution, oil absorption, brightness, and color characteristics of Examples 1 to 15 are shown below in Table 3.

TABLE 3

| Example | $d_{10}$ | $d_{50}$ | $d_{90}$ | $d_{99}$ | $d_{100}$ | Oil Absorption (wt %) | L | a | b | Blue Light Brightness |
|---|---|---|---|---|---|---|---|---|---|---|
| Feed | 1.12 | 2.96 | 6.96 | 15.56 | 22.00 | 70 | 86.70 | 1.16 | 4.26 | 69.89 |
| 1 | 1.20 | 2.93 | 6.14 | 11.00 | 15.56 | 75 | 86.55 | 0.96 | 4.33 | 69.56 |
| 2 | 1.09 | 2.60 | 5.23 | 9.25 | 13.08 | 76 | 86.76 | 1.14 | 4.23 | 70.03 |
| 3 | 1.17 | 2.80 | 5.68 | 10.09 | 15.58 | 75 | 86.67 | 1.11 | 4.32 | 69.77 |
| 4 | 1.09 | 2.61 | 5.34 | 10.09 | 13.08 | 74 | 86.72 | 1.08 | 4.29 | 69.89 |
| 5 | 1.02 | 2.41 | 4.96 | 9.25 | 13.08 | 73 | 86.83 | 1.14 | 4.28 | 70.09 |
| 6 | 1.01 | 2.45 | 5.08 | 9.25 | 13.08 | 74 | 86.73 | 1.17 | 4.25 | 69.96 |
| 7 | 1.09 | 2.64 | 5.37 | 9.25 | 13.08 | 69 | 86.78 | 1.14 | 4.27 | 70.01 |
| 8 | 1.22 | 3.01 | 6.66 | 13.08 | 18.50 | 68 | 86.12 | 1.06 | 4.11 | 69.11 |
| 9 | 1.10 | 2.66 | 5.46 | 10.09 | 13.08 | 72 | 86.35 | 1.00 | 3.98 | 69.65 |
| 10 | 1.10 | 2.60 | 5.14 | 9.25 | 13.08 | 75 | 86.41 | 1.04 | 3.95 | 69.79 |
| 11 | 1.07 | 2.57 | 5.18 | 9.25 | 13.08 | 79 | 86.19 | 1.03 | 4.03 | 69.33 |
| 12 | 1.02 | 2.35 | 4.55 | 7.78 | 11.00 | 75 | 86.40 | 1.07 | 4.07 | 69.63 |
| 13 | 1.03 | 2.38 | 4.25 | 7.78 | 11.00 | 75 | 86.39 | 1.10 | 4.13 | 69.54 |
| 14 | 0.93 | 2.19 | 4.66 | 9.25 | 13.08 | 81 | 86.34 | 1.07 | 4.18 | 69.39 |
| 15 | 0.97 | 2.20 | 4.30 | 7.78 | 11.00 | 80 | 86.09 | 1.08 | 4.08 | 69.10 |

Table 4 shows the physical properties of Example 13 in comparison to those of three commercial mineral anti-block products: Celite® Super Floss, Super Floss MX, and C263LD, which are based on flux calcined diatomaceous earth (Celite Corporation, Lompoc, Calif.).

TABLE 4

| Sample ID | $d_{10}$ | $d_{50}$ | $d_{90}$ | L | a | b | Blue Light Brightness | Wet Density (lb/cf) | Oil Absorption (wt %) |
|---|---|---|---|---|---|---|---|---|---|
| Example 13 | 1.03 | 2.38 | 4.25 | 86.39 | 1.10 | 4.13 | 69.54 | 48 | 75 |
| Super Floss | 2.63 | 7.83 | 21.93 | 95.42 | −0.04 | 1.65 | 88.80 | 24 | 135 |
| Super Floss MX | 4.05 | 10.15 | 21.43 | 96.94 | −0.03 | 1.64 | 91.70 | 23 | 139 |
| C263LD | 6.11 | 14.40 | 26.71 | 97.63 | −0.11 | 1.33 | 93.46 | 23 | 140 |

As can be seen above, exemplary embodiments of the ultrafine unexpanded perlite product offer a combination of physical properties that are generally comparable to those of the commercial anti-block products tested.

A. Anti-Block Performance in Low Density Polyethylene (LDPE) Films

The anti-block performance and the film properties of Example 13 were evaluated in the low density polyethylene (LDPE) formulation. Three commercial mineral anti-block products: Celite® Super Floss, Super Floss MX, and C263LD, which are based on flux calcined diatomaceous earth (Celite Corporation, Lompoc, Calif.). Films containing C263LD and Super Floss were prepared and tested separately.

TABLE 5

| Sample ID | Slip Agent (ppm) | Filler (ppm) | Induced Blocking (g) | Haze (%) |
|---|---|---|---|---|
| Example 13 | 750 | 2000 | 30.64 | 5.98 |
| Super Floss MX | 750 | 2000 | 26.82 | 6.49 |
| Super Floss | 750 | 2000 | 26.87 | 6.64 |
| C263LD | 750 | 2000 | 26.45 | 5.90 |

As can be seen above in Table 5, the ultrafine unexpanded perlite product of Example 13 provides antiblocking properties similar to those of the commercial diatomaceous earth anti-block products. The film haze properties of the ultrafine unexpanded perlite product of Example 13 are generally slightly better than those of the diatomaceous earth anti-block products.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A product comprising ultrafine natural glass having a top cut ($d_{99}$) particle size of less than 12 microns, wherein the ultrafine natural glass comprises unexpanded perlite ore, and wherein the unexpanded perlite ore comprises from 2 wt % to 10 wt % chemically-bonded water.

2. The product according to claim 1, wherein the top cut ($d_{99}$) particle size is less than 10 microns.

3. The product according to claim 1, wherein the top cut ($d_{99}$) particle size ranges from 7 microns up to less than 12 microns.

4. The product according to claim 1, wherein the ultrafine natural glass further has a ($d_{100}$) particle size of less than 20 microns.

5. The product according to claim 1, wherein the ultrafine natural glass further has a ($d_{100}$) particle size of less than 15 microns.

6. The product according to claim 1, wherein the ultrafine natural glass further has a median ($d_{50}$) particle size of less than 5 microns.

7. The product according to claim 1, wherein the ultrafine natural glass further has a median ($d_{50}$) particle size of less than 3 microns.

8. The product according to claim 1, wherein the ultrafine natural glass further has an oil absorption of less than about 75 percent by weight.

9. The product according to claim 1, wherein the ultrafine natural glass further has an L-value whiteness of greater than 80.

10. The product according to claim 1, wherein the ultrafine natural glass further has a Hunter b-value yellowness of less than 5.

11. The product according to claim 1, wherein the surface of the product is modified by silanization.

\* \* \* \* \*